United States Patent [19]

Kornely, Jr. et al.

[11] Patent Number: 5,005,757
[45] Date of Patent: Apr. 9, 1991

[54] BONDED SEGMENTED CYLINDRICAL MAGNET ASSEMBLY

[75] Inventors: Michael G. Kornely, Jr., Centerport; Robert G. Micich, Bethpage; John M. Miller, Huntington Station, all of N.Y.

[73] Assignee: Grumman Aerospace Corporation, Bethpage, N.Y.

[21] Appl. No.: 522,825

[22] Filed: May 14, 1990

[51] Int. Cl.⁵ ............................................. B23K 1/19
[52] U.S. Cl. ................................. 228/178; 228/182; 228/203; 228/246; 228/254; 228/258; 228/212; 228/263.13; 29/607; 29/609; 148/301
[58] Field of Search ........... 228/132, 134, 179, 180.1, 228/203, 212, 246, 258, 263.13; 29/607, 609; 148/301

[56] References Cited

U.S. PATENT DOCUMENTS

| | | | |
|---|---|---|---|
| 3,998,669 | 12/1976 | Strnat | 148/105 |
| 4,355,236 | 10/1982 | Holsinger . | |
| 4,360,760 | 11/1982 | Brodowski . | |
| 4,392,080 | 7/1983 | Maschke . | |
| 4,429,229 | 1/1984 | Gluckstern . | |
| 4,643,347 | 2/1987 | Bronnes et al. | 228/263.13 |
| 4,902,361 | 2/1990 | Lee et al. | 148/302 |

OTHER PUBLICATIONS

Y. Yamazaki, et al., "The 1 GeV Proton Linac for the Japanese Hadron Facility", Gar Electroforming.

*Primary Examiner*—Sam Heinrich
*Attorney, Agent, or Firm*—Pollock, VandeSande & Priddy

[57] ABSTRACT

A number of rare earth-cobalt permanent magnet segments are temporarily secured together by means of a tool. Before securement the segment surfaces at each interface are pre-tinned. A solder pre-form in the shape of a "wagon wheel" rests on one transverse end of the magnet so that the spokes of the pre-form overlie the interface joints. The magnet is then lowered into a gradually heated glycerine bath until the solder melts and directly flows over each interface. Upon slow cooling of the cylinder, metallurgical bonding is effected between the various segments of the magnet.

11 Claims, 1 Drawing Sheet

BONDED SEGMENTED CYLINDRICAL MAGNET ASSEMBLY

RELATED APPLICATIONS

This invention relates to the technology of co-pending U.S. Pat. application Ser. No. 07/507,768 filed Apr. 12, 1990, and co-pending U.S. Pat. application Ser. No. 07/518,441, filed May 3, 1990, both in the name of the same inventor and assigned to the same assignee.

FIELD OF THE INVENTION

The present invention relates to permanent magnets, and more particularly to a segmented rare earth quadrupole magnet.

BACKGROUND OF THE INVENTION

Multipole permanent magnets, such as quadrupole magnets are used in a number of applications, including their use as a component in drift tubes incorporated within a charged particle beam accelerator. Recent advances in rare earth cobalt materials have created extremely strong permanent magnets, such as from samarium cobalt. Appropriate discussions concerning these magnets and the materials used may be found in U.S. Pat. No. 4,429,229, issued Jan. 31, 1984, to Gluckstern; and U.S. Pat. No. 4,355,236 issued Oct. 19, 1982, to Holsinger, et al. Within many linear accelerator drift tubes, the magnet is employed to focus the charged particle beam passing therethrough along the axis of the drift tube. The reader is referred to co-pending U.S. Pat. application 07/507,768, filed Apr. 12, 1990, with a common assignee, for a discussion of a drift tube assembly and its utilization in a linear beam accelerator.

Typically, a quadrupole permanent magnet is employed which has a hollowed cylindrical shape, the cylinder being formed from elongated magnetic material segments, each having an arcuate cross-section. In order to maintain a near ideally symmetrical quadrupole, it is important that the various segments be precisely and permanently positioned to form a perfect hollowed cylinder. The prior art frequently utilizes 16 segments in the construction of a magnet. In view of the fact that the various segments naturally tend to repel one another, it is difficult to assemble them. Further, unless they are securely symmetrically fastened to one another, they can incrementally shift, relative to one another, as a result of heat expansion and contraction over time. This, of course, diminishes the symmetrical magnetic quadrupole effect that is necessary.

Metallurgical bonding of the individual segments has been previously attempted by electronic beam welding and brazing but these methods are impractical due to the fact that a rare earth quadrupole permanent magnet may be adversely affected if subjected to temperatures well over 100° for any protracted period of time. Attempts to use normal solder to achieve metallurgical bonding have met with failure due to the fact that the rare earth-cobalt magnetic material is brittle and has a low coefficient of thermal expansion. Thus, when the finished product is exposed to wide thermal variations during operation, the magnetic material fails at the interfaces between adjacent segments.

The prior art has attempted to solve this problem by encircling the magnet segments with a hoop for exerting radially inwardly directed forces which wedge the individual magnet segments together. A most common material for such a hoop is aluminum. However, the marked difference in the thermal coefficient of expansion between aluminum and the rare earth-cobalt material is substantial enough to cause different rates of expansion and contraction when thermal cycling occurs over a relatively large temperature range. This results in induced slipping forces exerted against the segments which adversely affects the desirable symmetrical quadrupole magnetic pattern.

BRIEF DESCRIPTION OF THE PRESENT INVENTION

The present invention solves the problems of assembling and retaining individual magnet segments by successfully metallurgically bonding the segments together. This is achieved by a two-step process. The first is the pre-tinning of segment interfaces with a compatible material such as indium. Thereafter, a compatible low melting temperature solder is forced between the surfaces of each interface by capillary action and in an oxygen-free environment. Proper choice of solder will expose the rare earth-cobalt segment material to temperatures and soldering times well below conditions that might adversely affect the quadrupole characteristics of an assembled magnet. After low temperature soldering has been accomplished, the individual segments become metallurgically bonded to one another thus assuring their permanent retention, relative to each other, even in an environment where wide variations in temperature are encountered.

By eliminating a retention hoop, the present invention increases or optimizes the size of a magnet that may be used within a drift tube.

In order to efficiently achieve metallurgical bonding, solder is pre-formed in a "wagon wheel" shape wherein the individual "spokes" are positioned against a cylindrical transverse end of a temporarily secured magnet; and wherein each spoke is positioned against a corresponding interface joint. When the solder is subjected to a melting temperature, the material from the spokes flows along a corresponding interface due to capillary action which ultimately causes metallurgical bonding between adjacent segments.

The end result of the present invention is the assembly and retention of magnet segments in a virtually perfect cylindrical configuration thereby assuring that a near-perfect quadrupole magnetic pattern will be retained, even in response to wide temperature variations.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
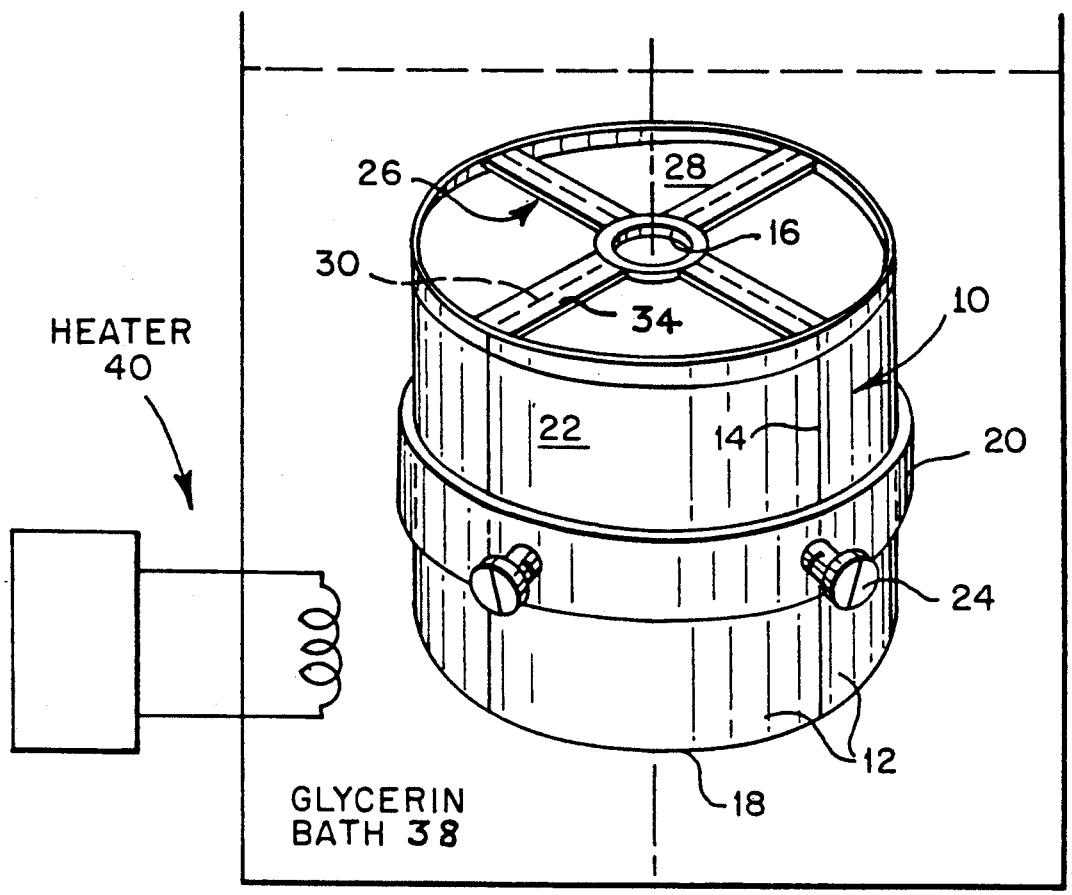
FIG. 1 is a perspective view of the present invention indicating the assembly of a rare earth segmented magnet in preparation of mechanical bonding of the segments.

A rare earth-cobalt hollowed cylindrical permanent magnet is generally indicated by reference numeral 10. Such a magnet is prior art and typically includes 16 segments to form a quadrupole permanent magnet. Although only four segments are illustrated in FIG. 1, it should be understood that this is for purposes of simplification. Four illustrated segments 12 are seen to be positioned in abutting relationship with one another to form interfaces 14 of rectangular cross section. The purpose of the present invention is to metallurgically bond the interfaces while the segments are properly positioned so as to permanently secure the segments to one another. Individual segments are axially aligned so that the lower illustrated transverse end 18, as well as the upper transverse end 28, of the hollowed cylinder are planar annular surfaces. In an initial step for fabricating the metallurgically bonded segments, it is necessary to pre-tin the interfaces 14 of the segments 12 so that a succeeding soldering step, to be discussed hereinafter, is successful. Prior to pre-tinning, the segment surfaces at each interface are heated to out-gas the surfaces which enables superior metallurgical bonding.

A typical material for pre-tinning is indium and the range of thickness for deposited indium is 5,000–25,000 Å. Deposition of the pre-tinning indium may be done by conventional means such as vacuum deposition.

The next step is the assembly of the various segments 12 to form the cylindrical configuration shown in FIG. 1. Since the various segments naturally repel one another, it is important to secure them in position. This is done with an appropriate tool which is diagrammatically illustrated in FIG. 1 as being a simple ring 20 positioned around the outer surface 22 of the cylinder and wherein individual adjustment screws 24 are threadably inserted within the ring 20 so as to achieve adjustable positioning of the individual segments. However, it is to be emphasized that various other tools may be employed to achieve this set-up.

Once the segments are temporarily fastened together, interfaces 14 between the various segments may be exposed to solder in order to complete the metallurgical bonding of the interfaces.

Figure 2:
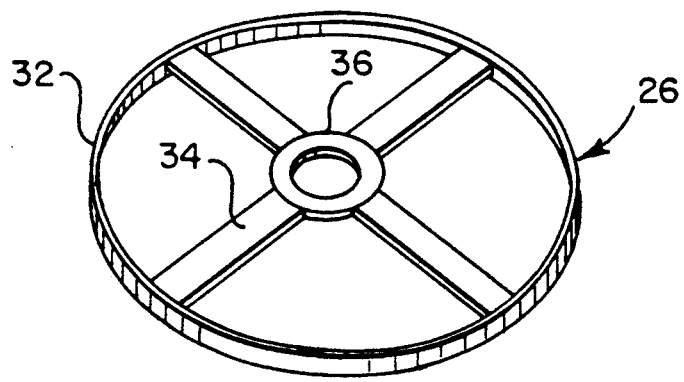
FIG. 2 is a perspective view of a pre-formed solder "wheel" employed in the metallurgical bonding of the magnet segments shown in FIG. 1.

In order to facilitate the soldering step, it is preferred that a solder pre-form, in the shape of a "wagon wheel," is positioned on the upper transverse end 28 of the magnet 10; and when the magnet is subjected to sufficient heat, the "spokes" 34 of the pre-form, preferably positioned over respective interface joints 30 (FIG. 1) melt and cause solder flow down through each interface 14 by capillary action. As shown in FIG. 2, a rim 32 secures the ends of the solder spokes 34 so as to render the solder pre-form 26 easier to handle. The solder spokes 34 end radially inwardly by opening 36 which is coaxially aligned with the bore 16 existing in the magnet 10. As will be appreciated, the wheel shape enables the solder to be exactly aligned with the interfaces thus assuring direct flow of melted solder into the interface 14 while minimizing the unwanted melting of solder over the entire surface of the magnet.

As previously mentioned it is important that the assembled segments of magnet 10 be prevented from exposure to temperatures much above 100° C. for any extended period of time. Such exposure will diminish the magnetization properties of magnet 10. An appropriate solder which can be used is a bismuth, indium, lead, tin, solder known in the industry as INDALLOY 136 which melts at a satisfactorily low temperature of 136°.

In order to heat the magnet with the solder pre-form positioned thereon, a glycerine bath 38 is employed as indicated in FIG. 1. A heater 40 slowly raises the glycerine temperature just above the melting point of the submerged solder pre-form which rests upon the upper transverse end 28 of the likewise submerged magnet 10. As the viscosity of the glycerine decreases, it adheres to the surfaces of interface 14 and serves as a solder flux. The solder material of spokes 34 melts just above the surfaces of interface 14 and completely covers those surfaces. The heat in the glycerine bath 38 is then slowly decreased so as to complete metallurgical bonding between the individual segments 12. By using a properly controlled glycerine bath as outlined, temperature gradients are avoided. Further, the submergence of the magnet into a glycerine bath minimizes oxidation of the interface surfaces while heat is applied to the metal. By slowly varying the temperature of glycerine bath 38, expansion and contraction of the individual segments 12 are identical; and the ring 20 can expand and contract near uniformly with the segments so that no slippage or mis-alignment occurs between the segments 12. After the completed magnet 10 is removed from the glycerine bath 38, the ring 20 may be removed. After the glycerine is cleaned from the outer magnet surface, it may be used.

It should be understood that the invention is not limited to the exact details of construction shown and described herein for obvious modifications will occur to persons skilled in the art.

We claim:

1. A method for bonding rare earth-cobalt magnet segments together to form a permanent magnet, the steps comprising:
    temporarily restraining the segments in abutting relation;
    gradually raising the temperature of the segments;
    applying melted solder to the joints existing at segment interfaces until the solder flows over interface surfaces by capillary action;
    cooling the magnet until the solder forms metallurgical bonds between mating interface surfaces; and
    removing the temporary restraint of the segments.

2. The method set forth in claim 1 wherein the application of solder is accomplished by positioning a solder pre-form in contact with a transverse end of the magnet.

3. The method set forth in claim 1 including the preparatory step of pre-tinning the surfaces at each interface.

4. The method set forth in claim 1 together with the preparatory step of heating the segments sufficiently to accomplish outgassing of the surfaces that will form interfaces.

5. The method set forth in claim 1 wherein the rare earth-cobalt is samarium cobalt.

6. A method for bonding axial segments of a rare earth-cobalt permanent magnet, the steps comprising:
    positioning the segments within a tool to form a hollowed cylinder;
    positioning a wagon wheel-shaped solder pre-form on a transverse end of the cylinder so that individual wheel spokes of the pre-form are aligned with interface joints in the transverse end;
    lowering the cylinder and the contacting solder pre-form into a bath containing flux material;
    gradually raising the temperature of the bath to a temperature avoiding demagnetization of the magnet while accomplishing melting of the solder;
    subjecting the cylinder to the elevated temperature for sufficient time to allow deposition of melted solder over the surfaces at each interface;

gradually lowering the temperature of the bath until metallurgical bonding between segments is achieved; and removal of the cylinder from the bath.

7. The method set forth in claim 6 wherein the magnet is a quadrupole magnet.

8. The method set forth in claim 6 wherein the segments are fabricated from samarium cobalt.

9. The method set forth in claim 6 together with the preparatory step of elevating the temperature of the segments sufficiently to accomplish outgassing of the surfaces which form interfaces.

10. The method set forth in claim 6 wherein the flux material is glycerine.

11. The method set forth in claim 9 together with the step of pre-tinning the surfaces forming interfaces.

* * * * *